June 26, 1956 F. W. SCRASE ET AL 2,751,821
HORIZONTAL BROACHING MACHINE
Filed Sept. 21, 1953 9 Sheets-Sheet 1
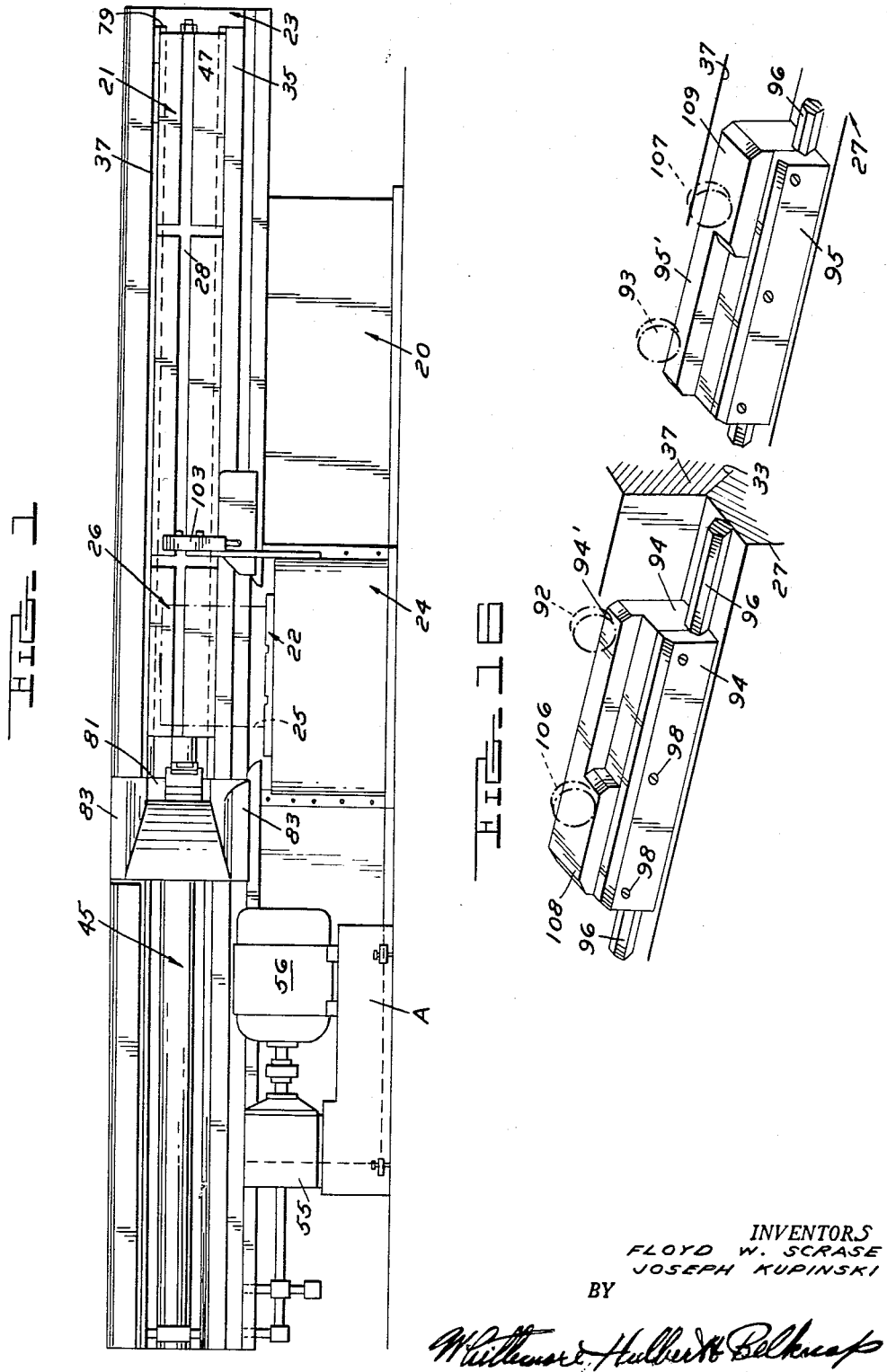
INVENTORS
FLOYD W. SCRASE
JOSEPH KUPINSKI
BY
ATTORNEYS

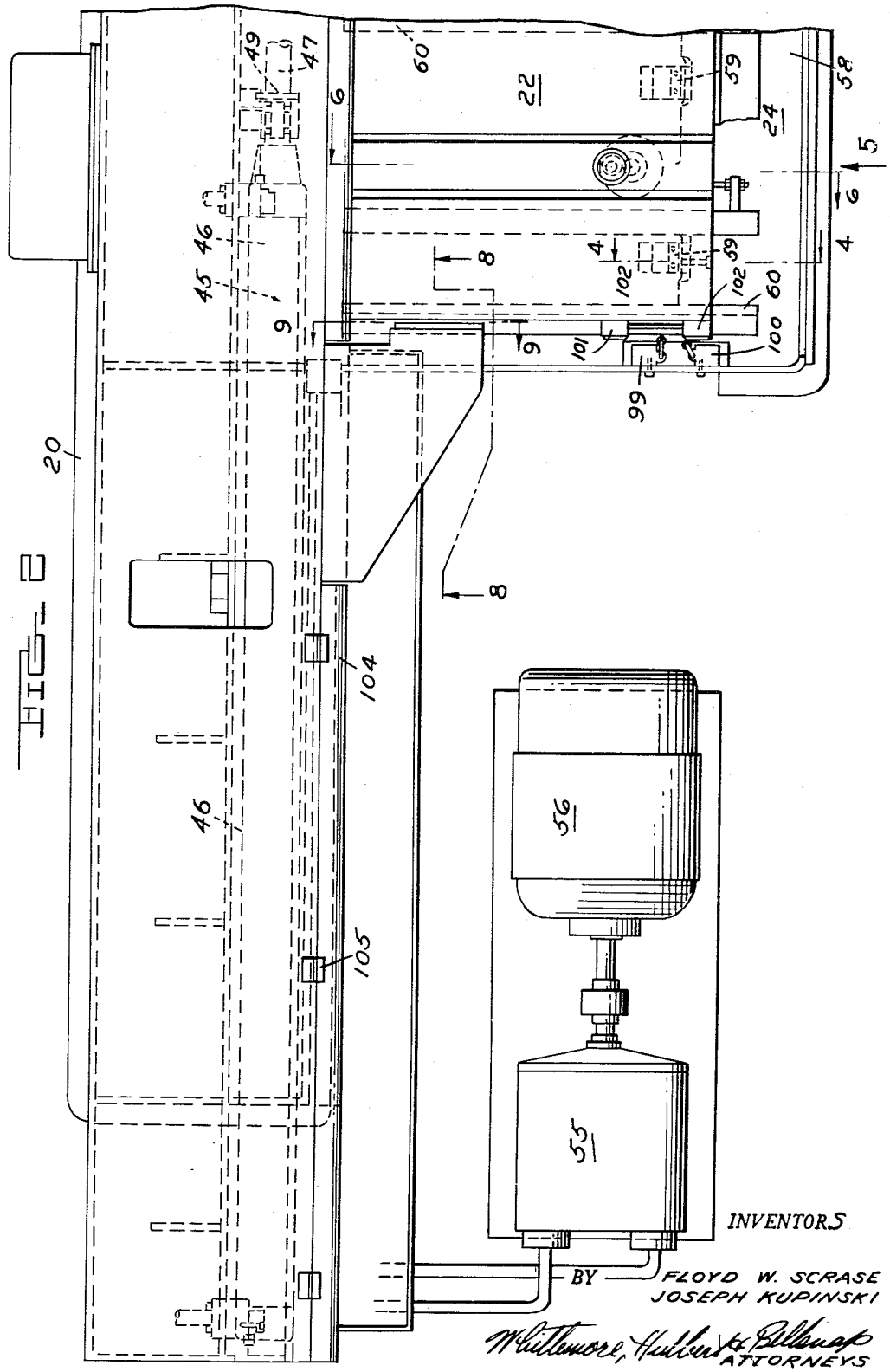

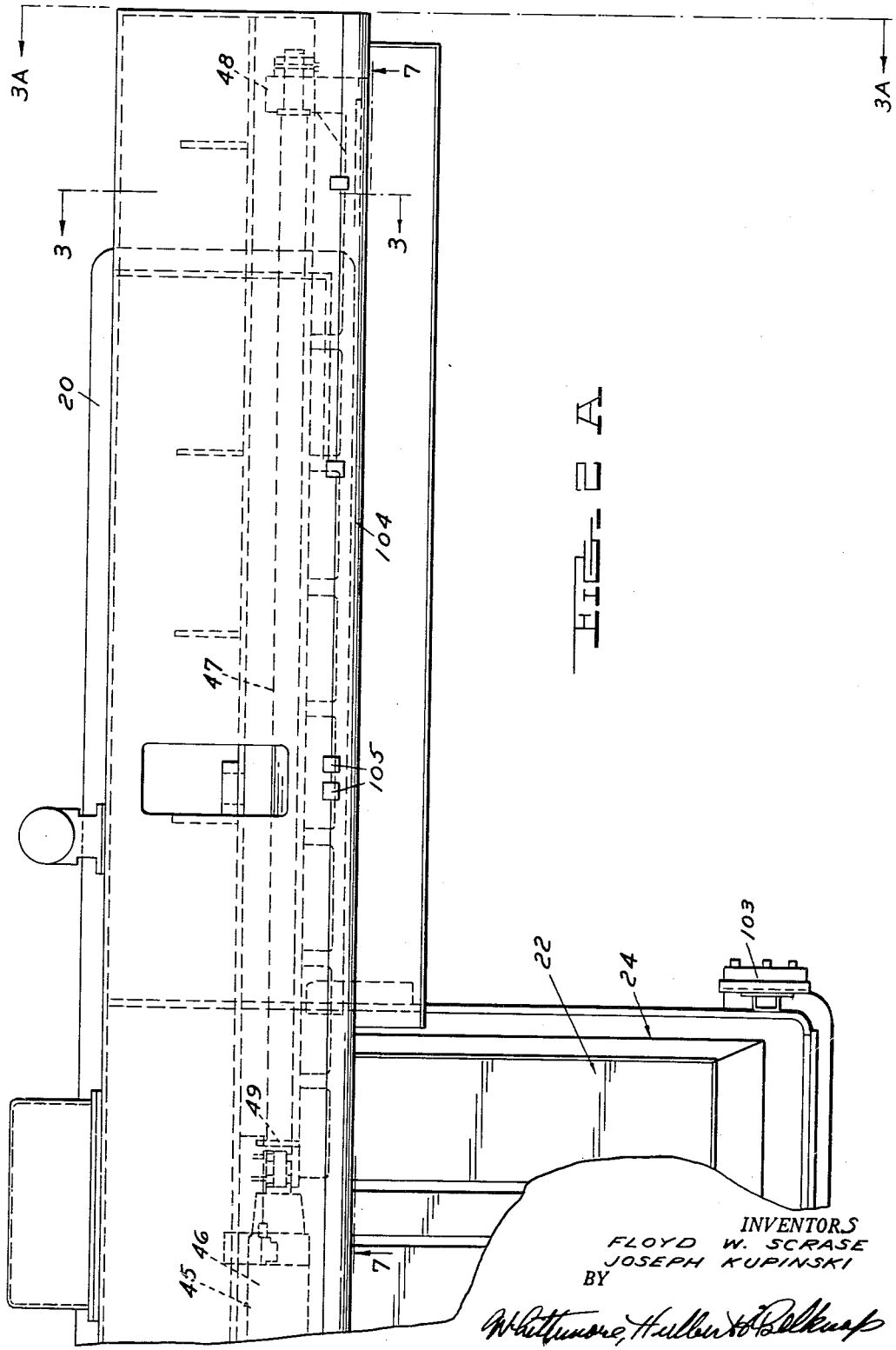

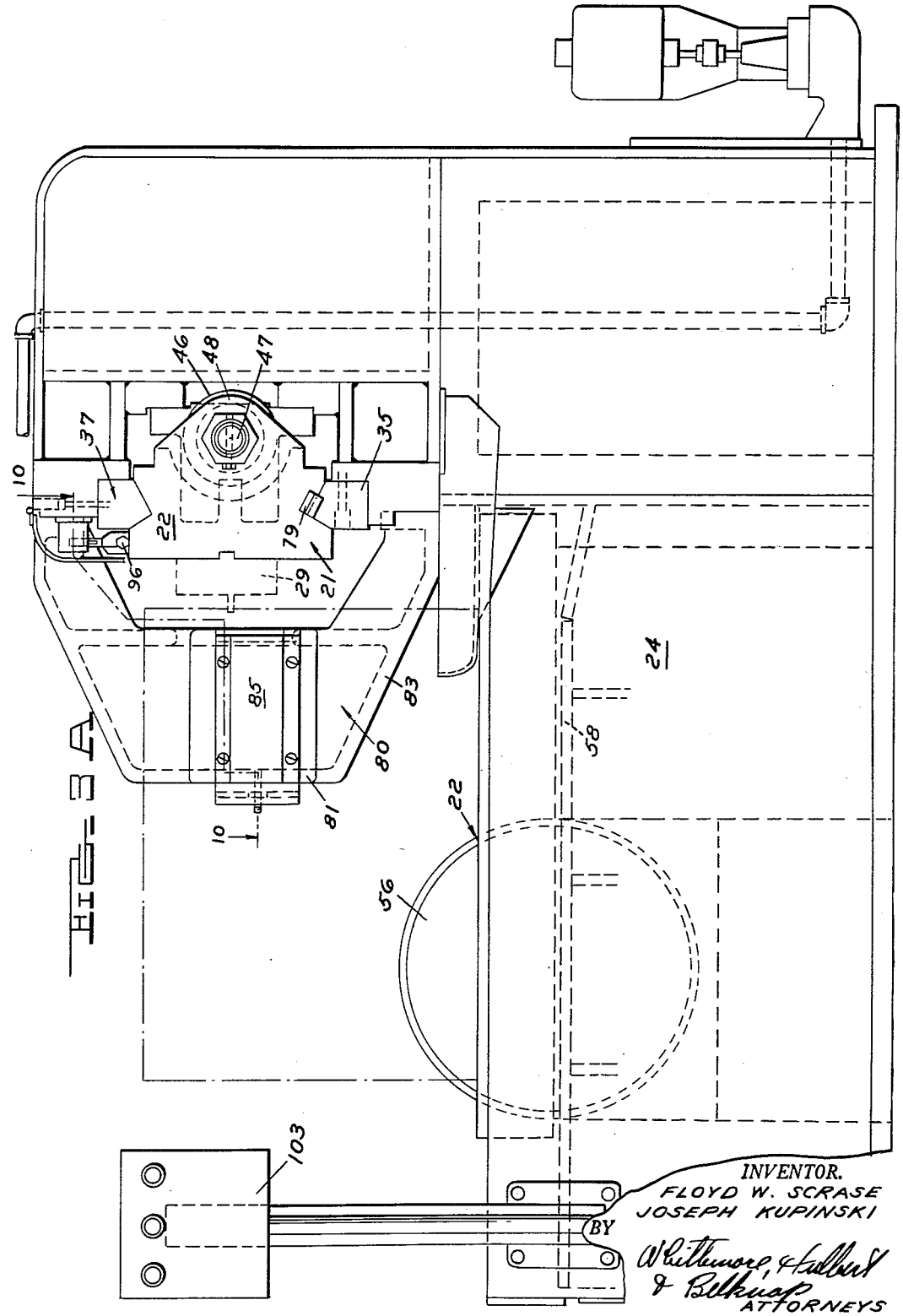

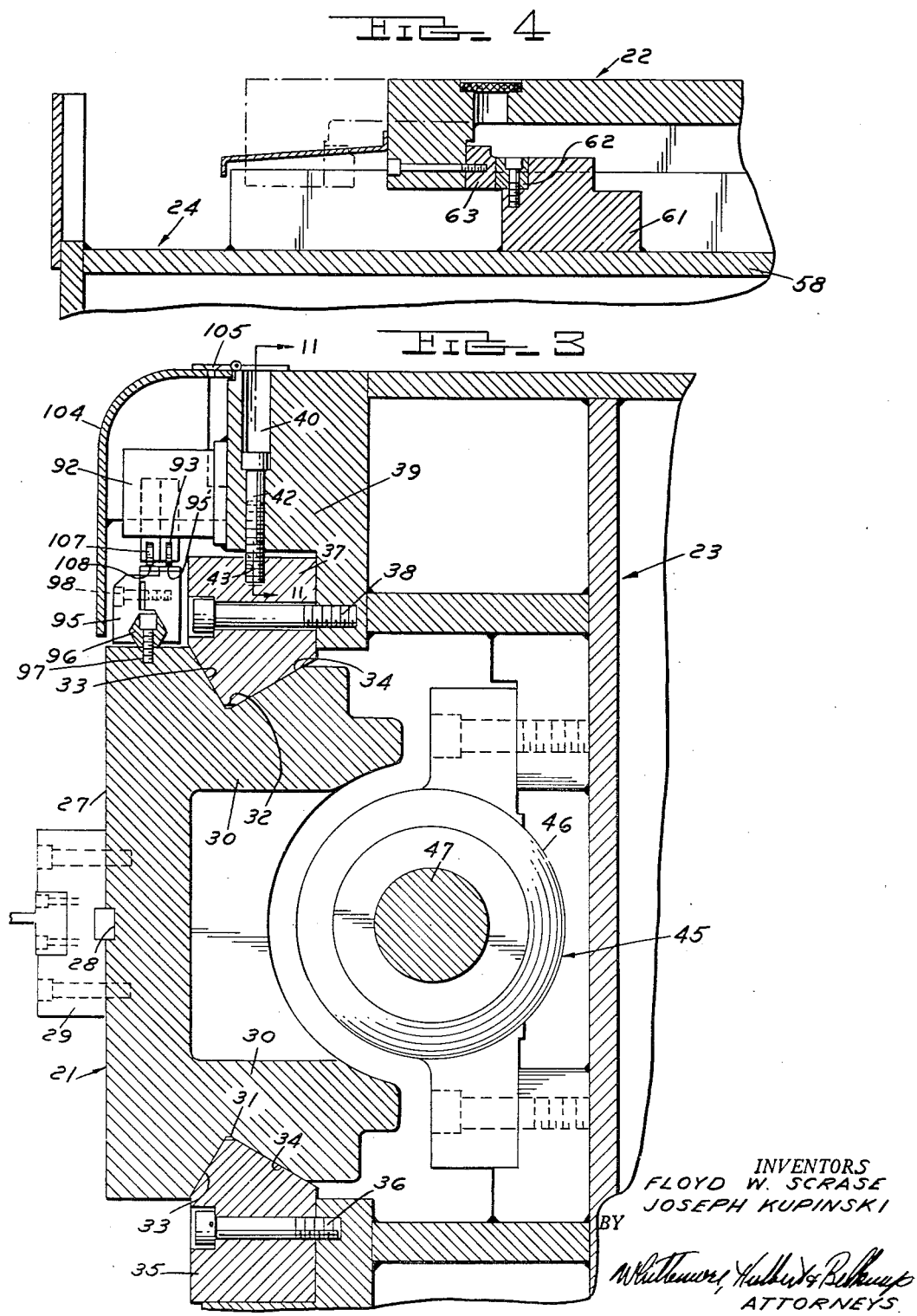

June 26, 1956  F. W. SCRASE ET AL  2,751,821
HORIZONTAL BROACHING MACHINE
Filed Sept. 21, 1953  9 Sheets-Sheet 6
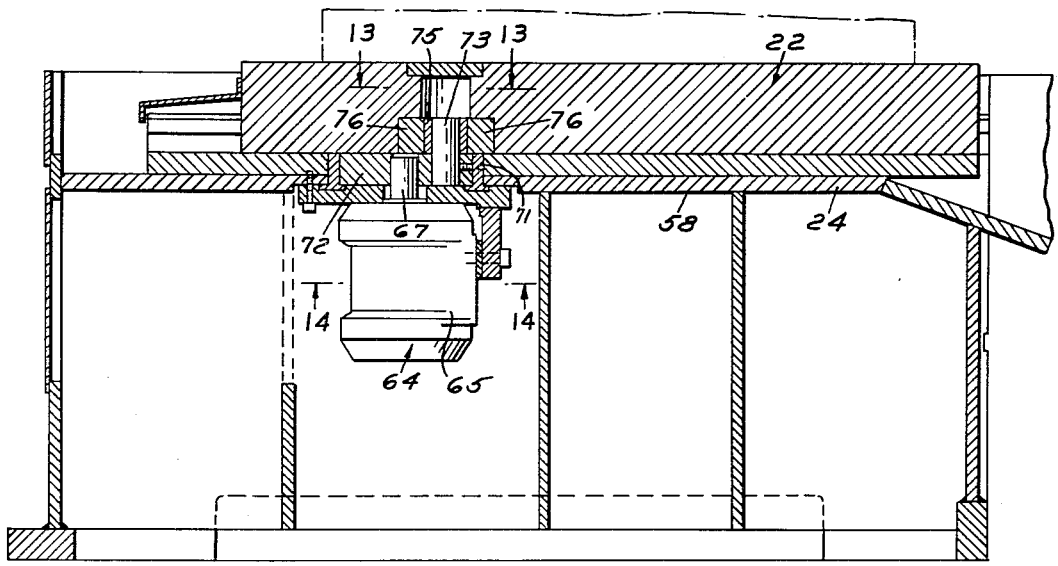
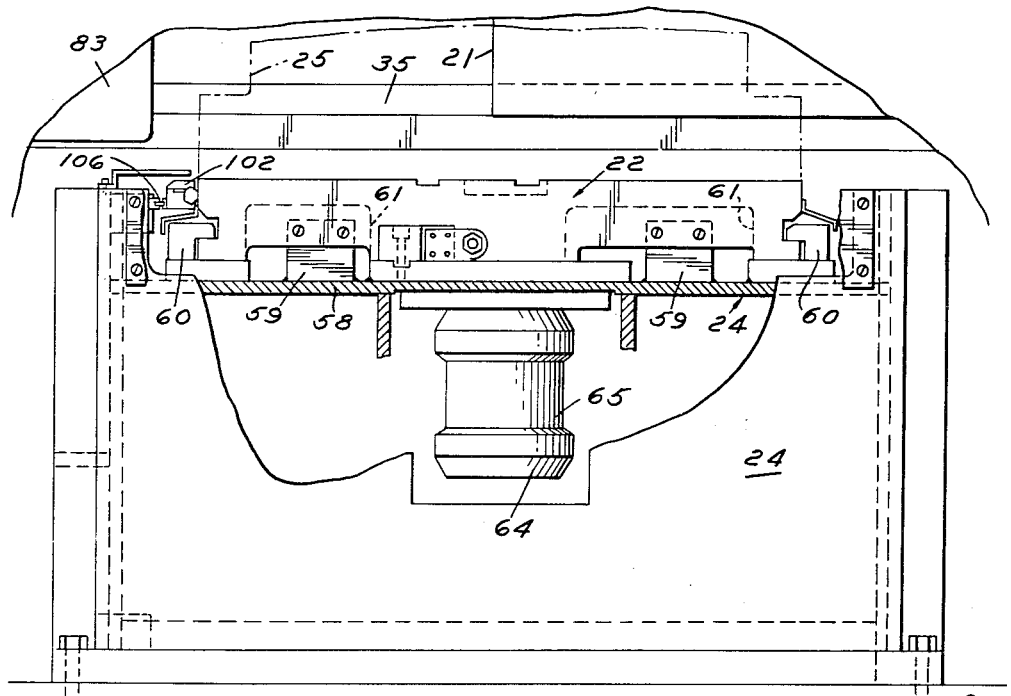
INVENTORS
FLOYD W. SCRASE
JOSEPH KUPINSKI
BY
ATTORNEYS

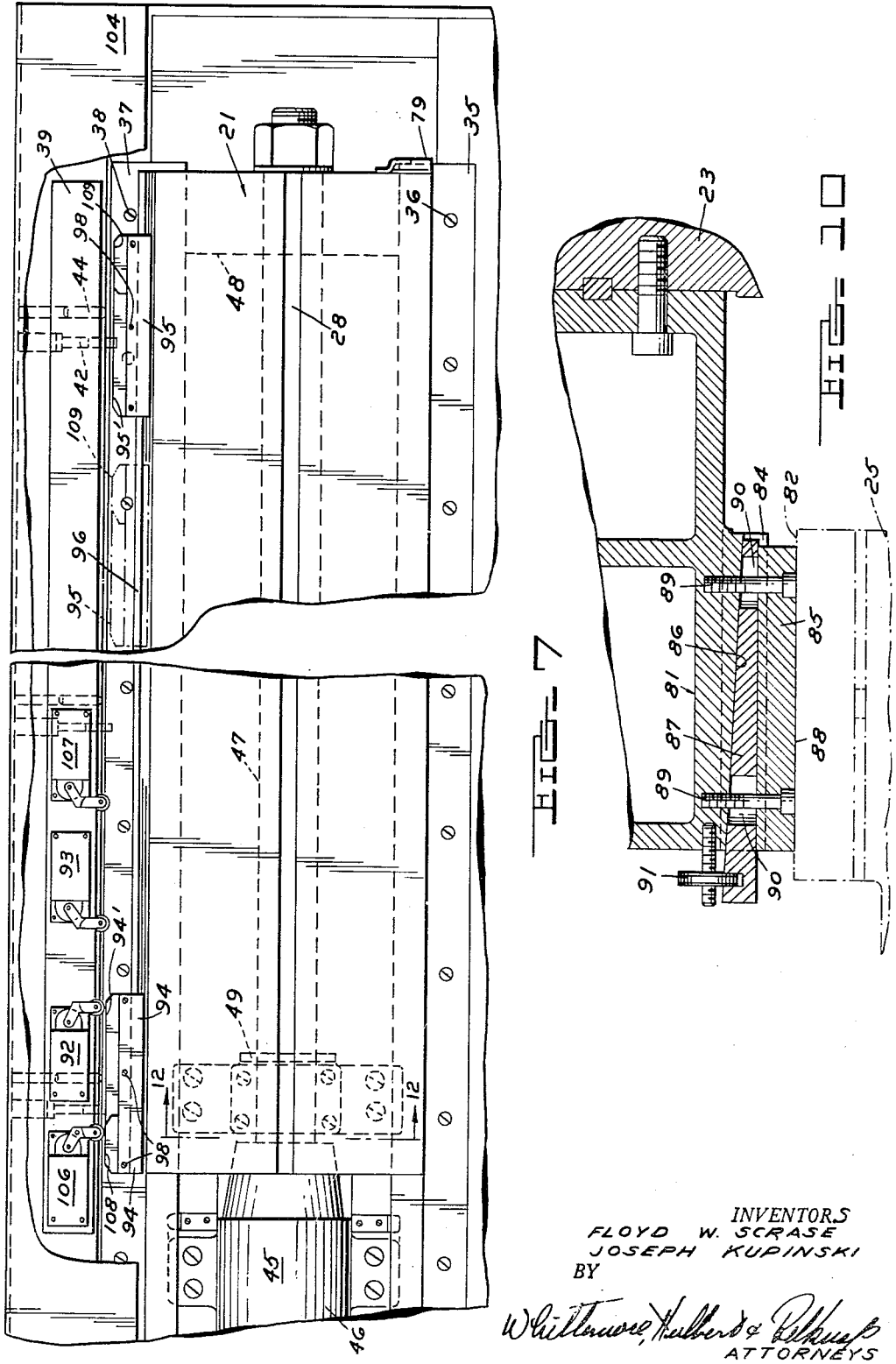

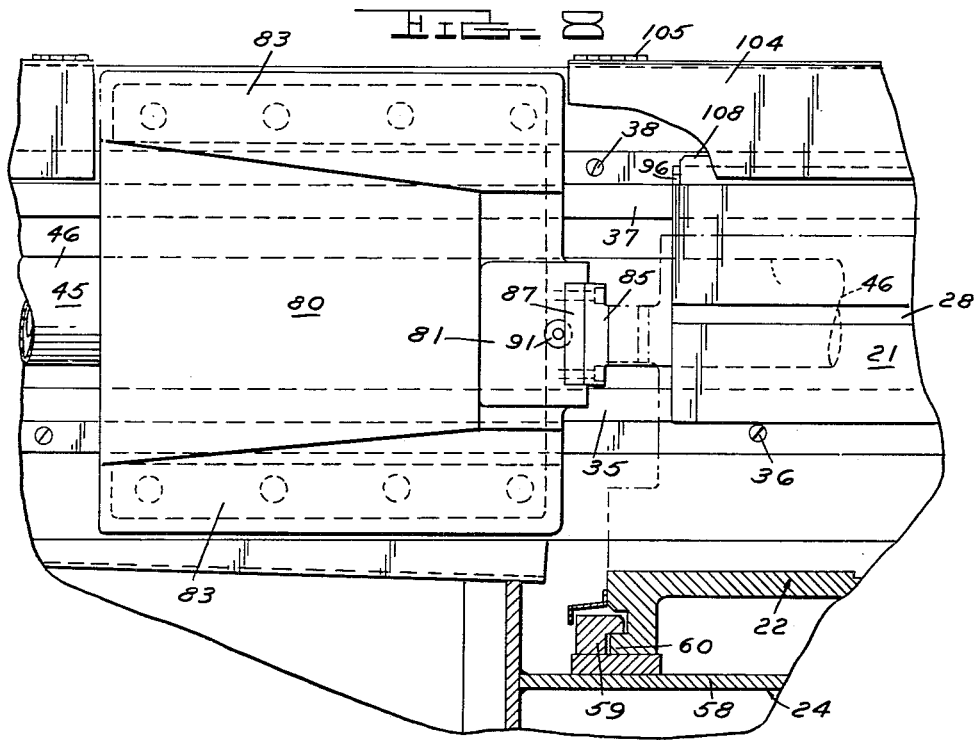
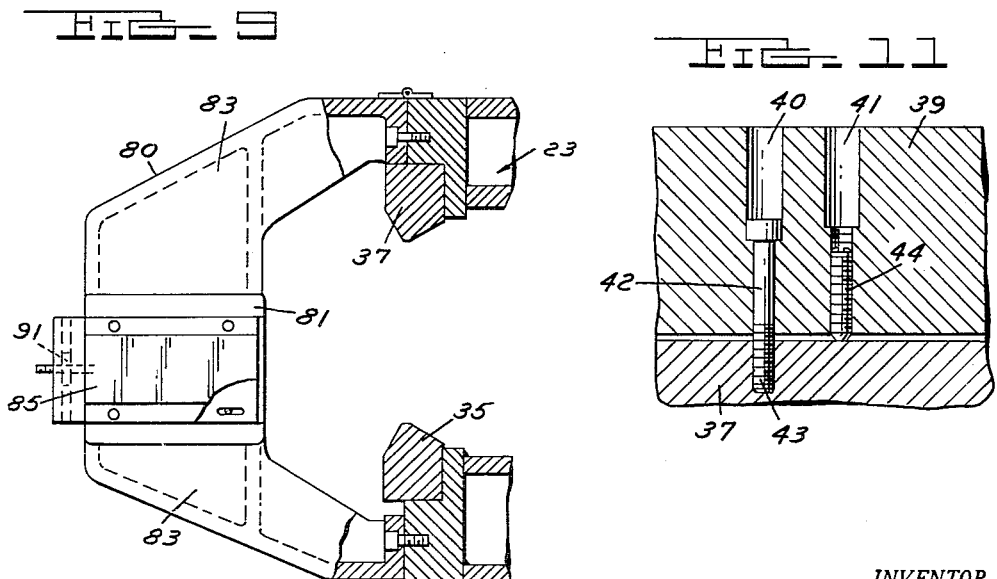

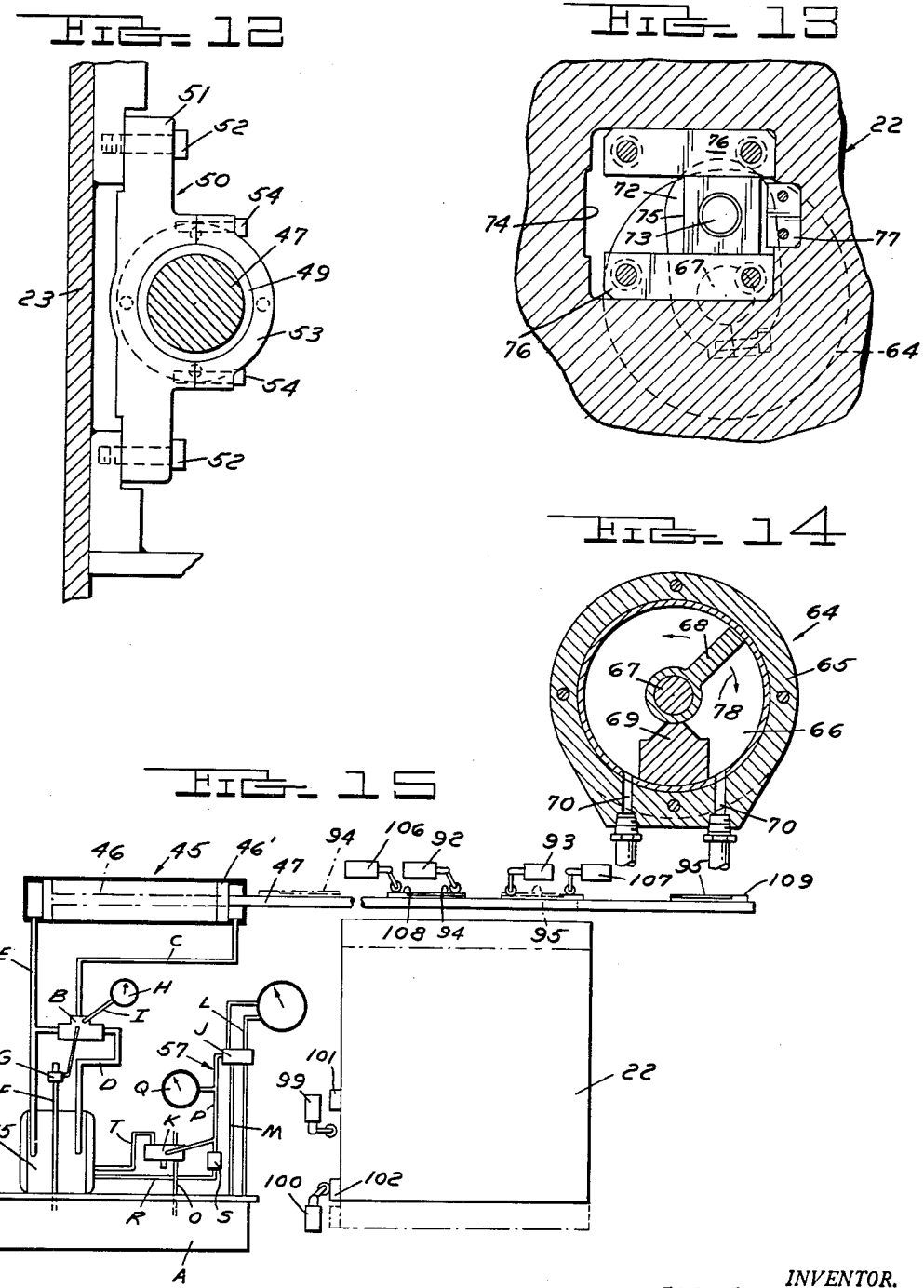

United States Patent Office 2,751,821
Patented June 26, 1956

2,751,821
HORIZONTAL BROACHING MACHINE

Floyd W. Scrase and Joseph Kupinski, Detroit, Mich., assignors to Detroit Broach Company, Inc., Rochester, Mich., a corporation of Michigan Application September 21, 1953, Serial No. 381,312

3 Claims. (Cl. 90—33)

This invention relates generally to broaching machines and refers more particularly to improvements in horizontal types of broaching machines.

It is an object of this invention to provide a horizontal broaching machine wherein the various parts thereof are so constructed and arranged to enable substantially reducing the overall length of a machine having a given stroke.

It is another object of this invention to provide a horizontal broaching machine wherein the broach carrying slide is supported in a manner to assure exceptional accuracy and wherein the cutting thrust on the work is transmitted to the machine frame in such a manner that displacement of the work by stresses resulting from the cutting thrust is eliminated.

The foregoing as well as other objects will be made more apparent as this description proceeds especially when considered in connection with the accompanying drawings, wherein:

Figure 1 is a side elevational view of a horizontal broaching machine embodying the features of this invention;

Figures 2 and 2A illustrate a plan view of the broaching machine;

Figure 3 is a sectional view taken on the line 3—3 of Figure 2A;

Figure 3A is an end elevational view looking in the direction of the line 3A—3A of Figure 2A;

Figure 4 is a sectional view taken on the line 4—4 of Figure 2;

Figure 5 is an end elevational view partly broken away and taken in the direction of the arrow 5 of Figure 2;

Figure 6 is a sectional view taken on the line 6—6 of Figure 2;

Figure 7 is a sectional view taken on the line 7—7 of Figure 2A;

Figure 8 is a sectional view taken on the line 8—8 of Figure 2;

Figure 9 is a sectional view taken on the line 9—9 of Figure 2;

Figure 10 is a sectional view taken on the line 10—10 of Figure 3A;

Figure 11 is a sectional view taken on the line 11—11 of Figure 3;

Figure 12 is a sectional view taken on the line 12—12 of Figure 7;

Figure 13 is a sectional view taken on the line 13—13 of Figure 6;

Figure 14 is a sectional view taken on the line 14—14 of Figure 6;

Figure 15 is a diagrammatic plan view illustrating the operation of the broach carrying slide and work supporting table;

Figure 16 is a perspective view of the limit switch operating cams.

The horizontal broaching machine forming the subject matter of this invention comprises essentially a base 20, a horizontal broach carrying slide 21, and a work supporting table 22. The base 20 is of hollow construction to accommodate suitable coolant and lubricant reservoirs, not shown herein. Suitably mounted on the top of the base 20 is a fabricated horizontally extending guide structure 23 for the slide 21, and secured to the front side of the base 20 intermediate the path of travel of the guide 21 is a knee or support 24 for the work table 22. The knee extends laterally outwardly from the front wall of the base 20 and the table 22 is mounted on the knee for sliding movement in directions toward and away from the slide 21.

A workholder 25 of any suitable construction (Figure 1) is supported on the table 22 for adjustment relative to the table in the directions of sliding movement of the latter, and has a rearwardly inclined top surface on which a suitable work indexing fixture 26 is mounted. The structure of the work holder 25 and of the indexing fixture 26 may be varied in accordance with the specific type of work to be broached. This structure forms no part of the present invention and is therefore not shown in detail herein. It will suffice to point out that the workholder 25 supports the work at the proper angle relative to the broach carrying slide and the indexing fixture 26 successively positions work pieces in operative relation to the broach carrying slide 21.

As shown in Figure 3 of the drawings, the broach carrying slide 21 is supported in a vertical plane by the guide 23 and is movable horizontally relative to the guide 23. The outer surface 27 of the slide 21 is fashioned with an elongated slot 28 intermediate the top and bottom edges of the slide 21. The purpose of the slot 28 is to permit attaching a broach 29 to the outer surface of the slide 21. Projecting laterally inwardly from the slide 21 are vertically spaced flanges 30 which extend lengthwise of the slide 21 and the lower flange is fashioned with a groove 31 which extends for the full length of the slide. The top flange 30 is formed with a similar groove 32 which is located directly opposite the groove 31.

Each of the grooves aforesaid are V-shaped in cross section or, in other words, are formed with converging walls or surfaces 33 and 34. A gib 35 is secured to the guide structure 23 below the slide 21 by studs 36 and projects into the bottom groove 31 in the slide 21. The projecting portion of the gib 35 has opposed walls fashioned to respectively slidably engage the walls 33 and 34 of the groove 31.

A cooperating gib 37 is secured to the guide 23 by a stud 38 and projects into the top groove 32 of the slide 21. The portion of the gib 37 which projects into the groove 32 is fashioned with opposed walls arranged to respectively slidably engage the walls 33 and 34 of the groove 32. It follows from the above that the two gibs cooperate with one another to slidably grip the slide 21 therebetween and prevent shifting movement of the slide 21 in directions transverse to the path of travel of the slide. In other words, the slide 21 is accurately guided throughout its path of travel by the gibs and hence it is possible to broach work within very close limits.

The top gib 37 may be vertically adjusted relative to the slide 21 in order to compensate for wear. In this connection, attention is again directed to Figure 3 of the drawings wherein it will be noted that the openings through the gib 37 for receiving the studs 38 have a diameter sufficiently greater than the shank portions of the studs to provide for ample vertical adjustment of the gib 37 relative to the guide 23. As shown in Figures 3 and 11 of the drawings, a part 39 of the guide 23 overhangs the top of the gib 37 and is formed at longitudinally spaced points with vertically extending adjacent openings 40 and 41. The openings 40 respectively receive studs 42 and the lower ends of the studs are threaded into tapped openings 43 formed in the gib 37. Each opening 41 is internally threaded at the lower end for receiving a set-screw 44 having the lower end bearing against the top edge of the gib 37. The arrangement is such that the gib 37 may be adjusted toward and away from the gib 35 by first relieving the studs 38 and 42, and then manipulating the set-screws 44. When the desired adjustment is obtained the studs 38 and 42 are again tightened to retain the gib 37 in its desired adjusted position.

As shown in Figure 7 of the drawings the slide 21 in moved in opposite directions relative to the guide 23 by a fluid motor 45 comprising a cylinder 46 secured in any suitable manner to the frame structure with its axis extending parallel to the path of travel of the slide 21 and having a piston 46' slidably supported therein. In the present instance, the fluid motor 45 is positioned inwardly of the slide 21 in order to enable movement of the slide in overlying relationship to the fluid motor, and the piston 46' within the cylinder 46 of the fluid motor is connected to the outer end of the slide 21 by a rod 47. The rod 47 extends outwardly along the inner side of the slide 21 and is connected to a part 48 which is shown in Figure 2A as extending laterally inwardly from the outer end of the slide 21.

As shown in Figure 12 of the drawings, the rod 47 is slidably supported adjacent the cylinder 46 in a bushing 49 secured to the adjacent frame structure by a two-part clamp 50. The base 51 of the clamp is secured to the guide structure 23 by studs 52 and the bushing is held in place on the base by a cap 53 secured in place by studs 54. The purpose of the bushing support previously described is to relieve the usual bushings (not shown) within the cylinder 46 from wear and thereby increasing the effective life of the fluid motor.

In the present embodiment of the invention, the fluid motor 45 is of the hydraulic type and is supplied with fluid under pressure by an oil gear type pump 55 (Figures 2 and 15) which is driven by an electric motor 56 and is connected by a hydraulic circuit 57 (Figure 15) to the cylinder 46. The circuit 57 has a reservoir A and an oil gear differential valve B having a port connected to one end of the cylinder 46 by a fluid line C. The valve B has a second port connected to the pump 55 by a fluid line D and has a third port connected to the pump 55 and to the other end of the cylinder 46 by a fluid line E.

The valve B is also connected to the reservoir A through a fluid line F and a pressure relief valve G. The reference character H designates a pressure gage which is connected to the valve B by a fluid line I. The arrangement is such that the valve B cooperates with the pump 55 to move the piston 46' in opposite directions in the cylinder 46.

As shown in Figures 2, 5, 6 and 8 of the drawings the work supporting table 22 is mounted on the top wall 58 of the knee for sliding movement in directions toward and away from the slide 21. Suitable ways 59 are secured to the top wall 58 of the knee 24 and cooperate with gibs 60 at the bottom of the table 22 to accurately guide the latter throughout its path of travel.

As shown in Figure 4 of the drawings, the operative or innermost position of the workholding table 22 is determined by blocks 61 secured to the top wall 58 of the knee 24 below the table 22 and spaced from one another in the direction of width of the table. Suitable abutments 62 of wear resisting material are secured to the outer sides of the blocks 61 in positions to respectively engage abutments 63 secured to the table 22 at the underside of the latter. In operation, the abutments 63 on the table 22 engage the abutments 62 on the knee 24 and locate the work on the indexing fixture 26 in the proper position relative to the broach 29 on the slide 21. It is important to note that the abutments are located beneath the table 22 where they are protected from foreign matter, cutting chips and the like.

The work supporting table 22 is shuttled back and forth along the knee 24 by a hydraulic motor 64 suitably supported on the knee 24 below the bottom wall 58 of the knee. The hydraulic motor 64 may be any one of a number of acceptable designs but is preferably of the type shown in Figures 6, 13, and 14 of the drawings. Briefly, the hydraulic motor 64 comprises a casing 65 having a circular chamber 66 therein and having a drive shaft 67 extending axially of the chamber 66. A vane 68 is secured to the shaft 67 within the chamber 66 and rotates in opposite directions from one side of a fixed shoe 69 in the chamber 66 to the other side of the shoe. The interior of the chamber has ports 70 located at opposite sides of the shoe and these ports are alternately connected to a fluid reservoir and to the pump 55 through directional valves J and K. As shown in Figure 15 of the drawings, the ports 70 are connected to the valve J through fluid lines L and the valve J is connected to the reservoir A through a fluid line M. The fluid line N serves to drain the valve J to the reservoir A, and a similar drain O is provided for the valve K. The valve K is connected to the valve J through a fluid line P having a pressure gage Q, and the line P is also connected to the pump 55 by a line R having a pressure relief valve S therein. The valve K is also connected to the pump 55 by a fluid line T. The above arrangement is such that the vane 68 of the motor 64 is movable in opposite directions by the hydraulic circuit 57. As will be presently described the vane 68 is connected to the table 22 in a manner such that the table is shuttled back and forth by the motor 64. The pump 55 is of the variable output type so that the rate of movement of the slide 21 and table 22 may be varied.

One end of the shaft 67 projects outwardly of the casing 65 and the hydraulic motor is supported on the knee 24 in a manner such that the shaft 67 projects upwardly through a clearance opening in the base 58 of the knee 24. As shown particularly in Figure 6 of the drawings, the bottom of the work supporting table 22 is recessed as at 71 to receive the upper end of the shaft 67 and a crank 72 is secured to the shaft 67. The crank 72 has a vertically upwardly extending pin 73 which projects into an opening 74 in the table 22 and a block 75 is journaled on the upper end of the crank pin 73. The block 75 is located between a pair of wear blocks or guides 76 secured to the table 22 at opposite sides of the block. The wear blocks 76 extend in parallel relationship at right angles to the path of travel of the table 22 and have a sliding engagement with opposite sides of the block 75. The purpose of the block 75 is to effect movement of the table 22 with a minimum amount of friction and the extent of travel of the block 75 in a direction toward the slide 21 is limited by the stops 61 secured to the knee 24 in a position to engage the abutments 62 on the table 22 as shown in Figure 4 of the drawings. Referring again to Figure 13 of the drawings, the numeral 77 designates a safety stop positioned to engage the block 75, if for some reason the stops 61 are improperly positioned.

Assuming that the table 22 is in its outermost position and that it is desired to move the table inwardly to its operative position relative to the slide 21, fluid under pressure is introduced into the chamber 66 of the hydraulic motor 65 at the lefthand side of the shoe 69 (Fig. 14) and is exhausted from the chamber 66 at the righthand side of the shoe 69. Thus, the vane 68 and the shaft 67 are rotated by the fluid under pressure in the direction of the arrow 78 in Figure 14 of the drawings. The crank 72 on the shaft 67 is rotated in a corresponding direction and the table 22 is moved inwardly toward the slide 21 by the eccentric 75. As stated above, the extent of inward movement of the table 22 is limited by engagement of the abutments 63 on the table 22 with the abutments 62 on the top wall 58 of the knee 24. The arrangement is such that the abutments 63 engage the abutments 62 before the crank 72 assumes a dead center position with respect to the shaft 67. In this connection, attention is directed to Figure 13 of the drawings wherein crank 72 is shown in the position it assumes when the table 22 is in its innermost or operative position relative to the slide 21. It will be noted from Figure 13 that when the table 22 is in its innermost position the crank 72 is approximately five degrees short of its dead center position. Also the above position of the crank is reached before the vane 68 approaches the end of its travel in the direction of the arrow 78 so that the pressure of the fluid acting on the vane 68 holds the table 22 in its operative or innermost position relative to the slide 21. It will of course be understood that reversing the flow of fluid under pressure to the hydraulic motor 65 effects movement of the table 22 in an outward direction relative to the broach carrying slide 21.

The slide 21 is shown in Figure 1 of the drawings in its outermost or retracted position and is located in the latter position by stops 79 mounted on the guide 23 at the outer extremities of the gibs 35 and 37. Thus, the cutting or broaching operation is accomplished upon inward movement of the slide 21 by the fluid motor 45. Before the slide 21 is moved on its cutting stroke, the table 22 is moved to its innermost position wherein a workpiece on the fixture 26 is positioned for engagement by the broach 29 on the slide 21. In order to assure accurate broaching of the workpiece, provision is made herein to take up the thrust of the cutting operation and this is accomplished by a back-up bracket 80 shown best in Figures 3A, 8, 9 and 10. The back-up bracket 80 is positioned inwardly of the workholder 25 and has a central part 81 positioned directly opposite a bearing surface 82 formed on the inner side of the workholder 25. The part 81 is respectively connected to the guide 23 beyond the gibs 35 and 37 by arms 83 and hence is rigidly secured to the machine frame. As shown particularly in Figure 10 of the drawings, the outer surface of the part 81 is fashioned with a recess 84 and a bearing pad 85 is slidably supported in the recess 84. The recess 84 extends in a direction to enable sliding movement of the bearing pad 85 in directions at right angles to the path of travel of the slide 21 and the base 86 of the recess 84 is tapered with respect to the adjacent face of the pad 85. A wedge 87 is positioned between the tapered base 86 and the adjacent surface of the bearing pad 85. The inner surface of the wedge 87 is tapered to correspond with the tapered base 86 and the outer surface is fashioned to lie parallel with the adjacent plane surface of the pad 85 so that the outer surface 88 of the bearing pad 85 is maintained at all times in a plane parallel to the bearing surface 82 on the work support 25.

The bearing pad 85 and the wedge 87 is secured to the central part 81 of the back-up bracket 80 by studs 89 which extend through enlarged openings 90 formed in the wedge 87. With this construction, the location of the bearing pad 85 may be varied relative to the bearing surface 82 on the work support 25 by merely adjusting the wedge 87 and this adjustment is accomplished by a thumb screw 91 shown in Figure 10 of the drawings. When initially setting up the machine the wedge 87 is adjusted to insure engagement of the bearing pad 85 with the bearing surface 82 on the work support 25. As shown in Figure 3A of the drawings, the bearing pad 85 is located directly opposite the broaching tool 29 on the slide 21 so that the stress applied to the work support 25 by the cutting operation is transferred directly to the machine frame through the back-up bracket 80, and displacement of the workholder 25 by such stresses is prevented.

The broach slide 21 and the work supporting table 22 are moved in timed relationship during the operation of the machine. As shown in Figure 7 of the drawings, a pair of limit switches 92 and 93 are secured in longitudinal spaced relationship to the guide 23 above the slide 21. The limit switches are respectively operated by cam blocks 94 and 95 secured to a rail 96 which in turn extends lengthwise of the slide 21 and is secured to the top edge of the slide by studs 97. The blocks 94 and 95 are respectively formed with cam surfaces 94' and 95' positioned to respectively engage the limit switches in response to movement of the slide 21 in opposite directions. As shown in Figure 3 of the drawings, each cam is formed of two sections clamped against opposite sides of the rail 96 by studs 98 rendering it possible to independently adjust the cams to different positions along the slide 21 (Figure 16) and thereby enable varying the effective stroke of the slide 21.

As shown in Figures 2 and 15 of the drawings, a pair of limit switches 99 and 100 are secured to the knee 24 in spaced relationship in the direction of movement of the work supporting table 22. The limit switches 99 and 100 are respectively operated by cams 101 and 102 mounted on one side edge of the table 22 for relative adjustment in the direction of movement of the table 22.

The limit switches, 92, 93, 99 and 100, are electrically connected in a suitable control circuit (not shown) in a manner such that both the slide 21 and the work supporting table 22 are operated in proper timed relationship. The specific arrangement is such that as the table 22 is moved to its innermost or operative position with respect to the slide 21, the cam 102 operates the limit switch 100. The operation of the limit switch 100 renders the valve B operative to connect the inner end of the cylinder 46 to the pump 55 and the outer end of the cylinder 46 to the reservoir 14. Thus, the slide 21 is moved on its cutting stroke from the retracted position thereof shown in Figure 1. As the slide 21 approaches the end of its cutting stroke, the cam surface 95' operates the limit switch 93 which in turn operates the valves J and K to render the motor 64 effective to move the table 22 to its retracted or outermost position with respect to the slide. As the table 22 approaches its retracted position, the cam 101 operates the limit switch 99 and the latter in turn operates the valve B to reverse the action of the fluid motor 45 and return the slide 21 to its retracted position. As the slide 21 approaches its retracted position the cam surface 94' operates the limit switch 92 which in turn operates the valves J and K to render the motor 64 effective to move the table 22 inwardly to its operative position adjacent the slide 21. This cycle of operation is repeated until the operation of the machine is discontinued.

Referring again to Figure 7 of the drawings, it will be noted that safety limit switches 106 and 107 are secured to the guide 23 above the slide 21. These limit switches are not only spaced from each other and from the first pair of limit switches 92 and 93 in the direction of length of the guide 23, but in addition are offset laterally from the limit switches 92 and 93 in positions to be respectively operated by cam surfaces 108 and 109 on the cam blocks 94 and 95. The relationship of the cam surfaces 94', 95' and 108, 109 is clearly shown in Figure 16 of the drawings. It is apparent from Figure 16 that the cam surfaces 108 and 109 are not only arranged to respectively operate the limit switches 106 and 107 in response to movement of the slide in opposite directions but, in addition, operate the latter limit switches at the same time the limit switches 92 and 93 are respectively operated by the cam surfaces 94' and 95'. In the present instance, the limit switches 106 and 107 are electrically connected in the control circuit (not shown) in a manner to control the operation of both the slide 21 and table 22 should either or both the limit switches 92 and 93 fail to operate for some reason.

The limit switches 92, 93, 106, and 107 and associated cams are concealed by a cover 104 extending lengthwise of the guide 23 and hinged to the guide by suitable hinges 105. The cover 104 aside from improving the appearance of the machine also protects the top gib 37 and prevents foreign matter from accumulating in the groove 32 in the slide 21. As shown in Figure 8 of the drawings, the cover 104 is cut away adjacent the back-up bracket 80 to provide clearance for the latter.

What we claim as our invention is:

1. In a broaching machine, a bed, a super-structure thereon having vertically spaced laterally projecting and longitudinally extending parallel portions, a broach carrying slide on which the tool is mounted, and spaced upper and lower portions extending within the spaced portions of said super-structure with V-shaped channels in their top and bottom faces extending longitudinally thereof, gibs mounted on the spaced portions of the super-structure having V-shaped ways engaging said channels and forming slideways therefor, one of said gibs being adjustable on its mounting to take up wear, and a fluid motor including a cylinder, piston and piston rod located in the space between said parallel portions being connected at one end to said super-structure and at the opposite end to said slide.

2. The construction as in claim 1 having a laterally projecting portion of said bed, a work carriage mounted on said portion and guided for movement in a direction transverse to that of said slide, and an oscillatory rotary fluid motor for actuating said carriage toward and from said slide.

3. The construction as in claim 2 provided with a back-up member having a bifurcated portion mounted on said laterally spaced portions of said super-structure to clear said slide, and a bearing thereon engaging said carriage to take the thrust of the work load.

References Cited in the file of this patent

UNITED STATES PATENTS

| | | |
|---|---|---|
| 1,642,593 | Perkins | Sept. 13, 1927 |
| 1,957,472 | Pankratz | May 8, 1934 |
| 2,024,251 | Romaine | Dec. 17, 1935 |
| 2,162,814 | Hart | June 20, 1939 |
| 2,165,662 | Swan | July 11, 1939 |
| 2,321,741 | Flowers | June 15, 1943 |
| 2,340,450 | Bouschor | Feb. 1, 1944 |
| 2,372,825 | Grad | Apr. 3, 1945 |